April 3, 1962
C. L. TICHENOR
3,027,770
APPARATUS FOR DETECTING MOTION
Filed May 12, 1960
4 Sheets-Sheet 1
FIG. 1.
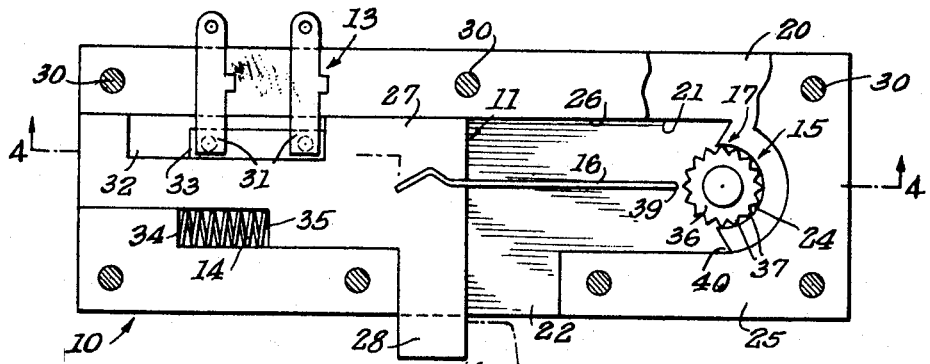
FIG. 2.
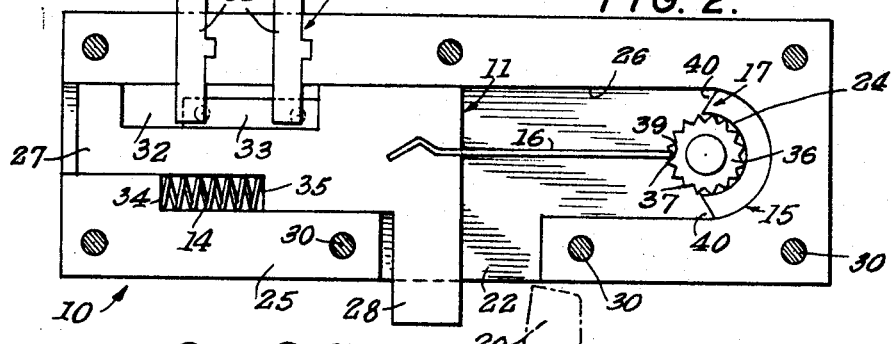
FIG. 3.
FIG. 4.
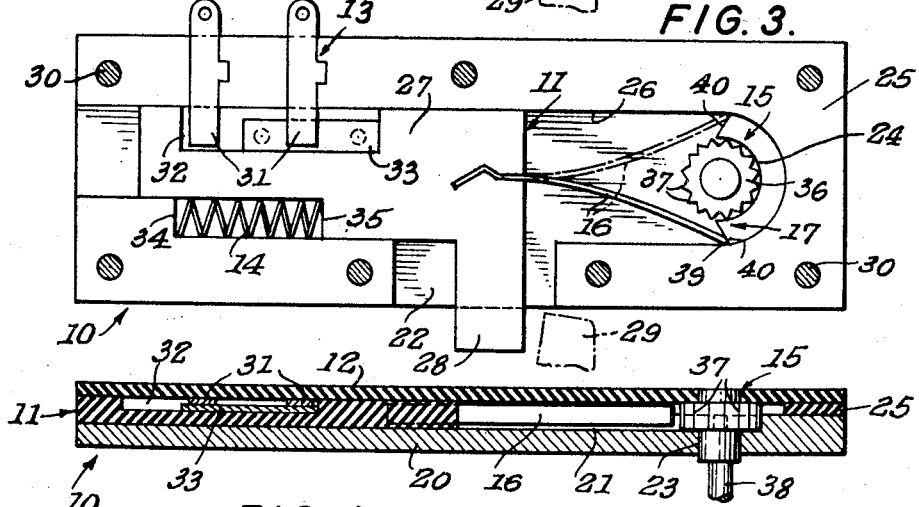
INVENTOR.
CLYDE L. TICHENOR
BY
W. J. Gribble
ATTORNEY April 3, 1962     C. L. TICHENOR     3,027,770
APPARATUS FOR DETECTING MOTION Filed May 12, 1960     4 Sheets-Sheet 2

INVENTOR.
CLYDE L. TICHENOR
BY
W. J. Gribble
ATTORNEY

April 3, 1962 C. L. TICHENOR 3,027,770
APPARATUS FOR DETECTING MOTION
Filed May 12, 1960 4 Sheets-Sheet 3

INVENTOR.
CLYDE L. TICHENOR
BY
W. J. Gribble
ATTORNEY

April 3, 1962     C. L. TICHENOR     3,027,770
APPARATUS FOR DETECTING MOTION
Filed May 12, 1960     4 Sheets-Sheet 4

INVENTOR.
CLYDE L. TICHENOR
BY
W. J. Gribble
ATTORNEY

United States Patent Office 3,027,770
Patented Apr. 3, 1962

3,027,770
APPARATUS FOR DETECTING MOTION
Clyde L. Tichenor, Rte. 2, Box 147F, Joplin, Mo.
Filed May 12, 1960, Ser. No. 28,655
20 Claims. (Cl. 74—2)

The invention relates to devices for detecting arresting of motion, for instance the rotary motion of a shaft. This application is a continuation-in-part of my co-pending application Serial No. 728,923 filed April 16, 1958, and now abandoned and entitled "Motion-Detecting Device."

Many devices exist for detecting the absence or presence of motion in a particular body. Most of these devices conventionally are very complicated, requiring many component parts with consequent bulk. They are subject to a great deal of frictional wear and require continuous adjustment. I have invented apparatus for detecting motion or the absence of motion which may be embodied in a relatively small package, may be simply constructed from readily available materials, and which may be fabricated by conventional manufacturing means.

The apparatus of the invention has many different uses. It adapts to control means by way of a switch or a valve. As an example, the apparatus of the invention may be used as an automatic brake setter for automobiles or other vehicles. In such usage motion of the propeller shaft only of the automobile is translated by the device into movement of the device between set or unset brake positions after the device has been set to the given position by application of the brakes.

The invention contemplates apparatus comprising a base, a carriage member moveable relative to the base, and means biasing the carriage member to a projected position. The carriage member is adapted to be retracted by an outside force applied to it. The inventive apparatus further comprises control means operated between control and non-control positions by the projection and retraction of the carriage member. A rotatable element has its axis in dead-center alignment with the path of an engaging element as carried by the carriage member so that the engaging element effects dead-center engagement with the rotatable element when that element is non-rotational. Such dead-center engagement holds the carriage member partly retracted. The control means is such that it maintains its control position during both retraction and partial projection of the carriage member.

The control means may be an electrical switch or a fluid valve, either pneumatic or hydraulic. In a preferred embodiment of the invention for use in conjunction with vehicle braking systems, the control means is an unique hydraulic valve particularly adapted to use with the apparatus of the invention. The valve holds the vehicle brakes in set position in response to the projected or retracted position of the carriage member as it detects motion, or lack of motion, in the rotatable member of the apparatus.

While the following detailed description relates primarily to apparatus for detecting motion in relation to vehicle braking systems, such description is illustrative only and is not intended to define the scope of the invention. Further advantages of the invention are apparent from the description and drawing, in which like reference characters designate similar parts in the several views.

FIG. 1 is a plan view of a motion detecting device according to the present invention, with the face-plate of the device removed to show the parts in the position assumed upon application of an outside force;

FIG. 2 is a similar view of the device after release of the outside force;

FIG. 3 is another similar view of the device of FIG. 1 in the position assumed by the device when a shaft element thereof is rotating;

FIG. 4 is a longitudinal sectional view, taken along line 4—4 of FIG. 1;

Figure 5:
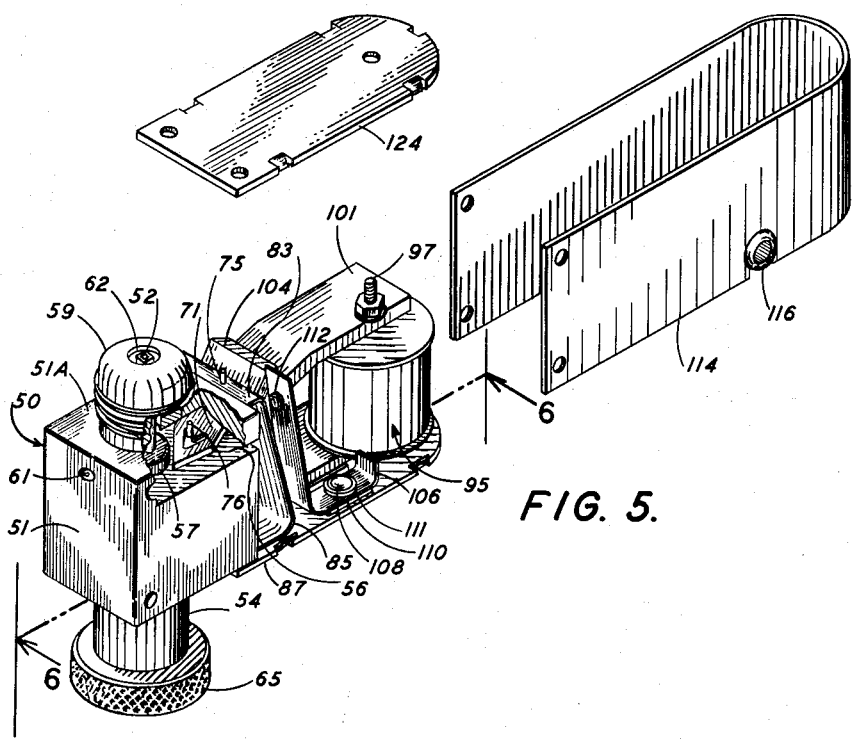
FIG. 5 is an exploded view of an alternate embodiment of the invention, partly broken away to show more clearly the operation of the carriage or sliding member.
Figure 6:
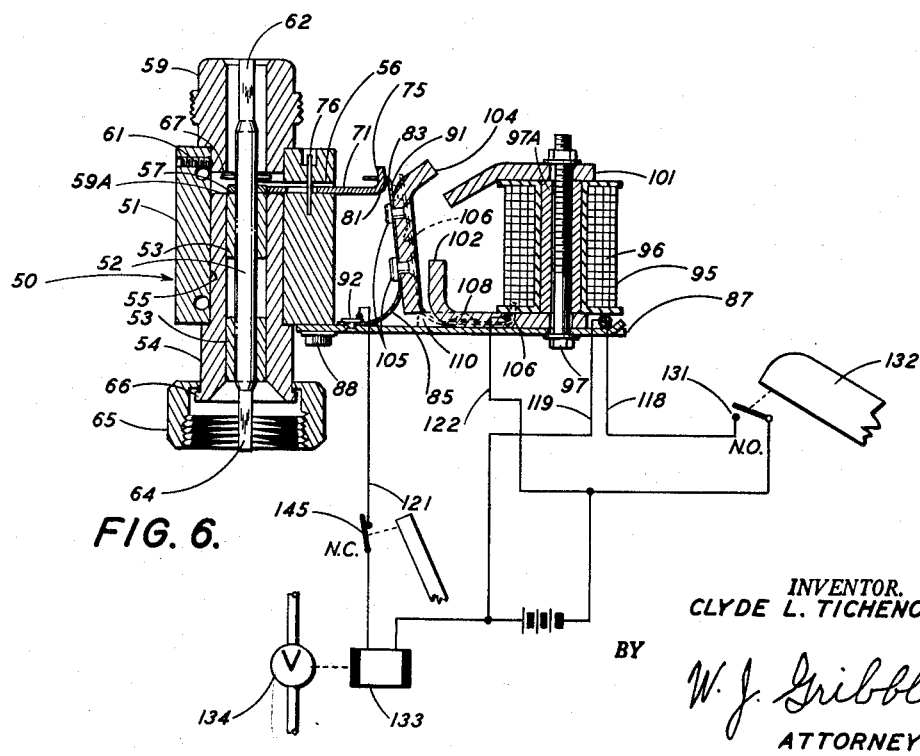
FIG. 6 is a longitudinal sectional elevation of the embodiment of FIG. 5 augmented by a schematic wiring diagram.
Figure 7:
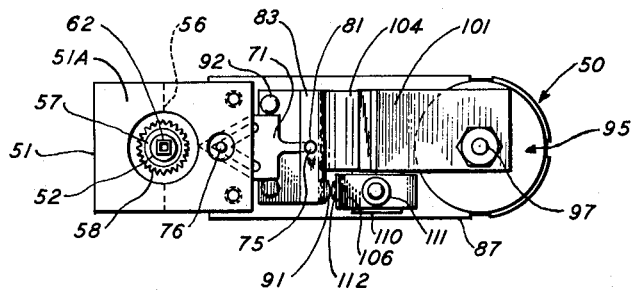
FIG. 7 is a plan view of the alternate embodiment of FIGS. 5 and 6.
Figure 9A:
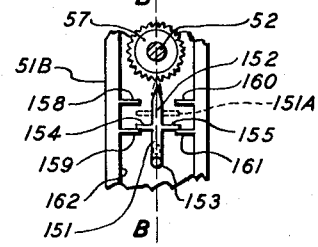
Figure 9B:
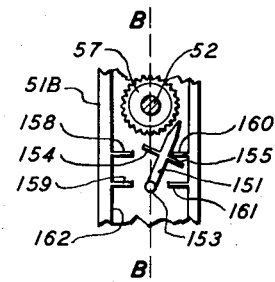
Figure 10:
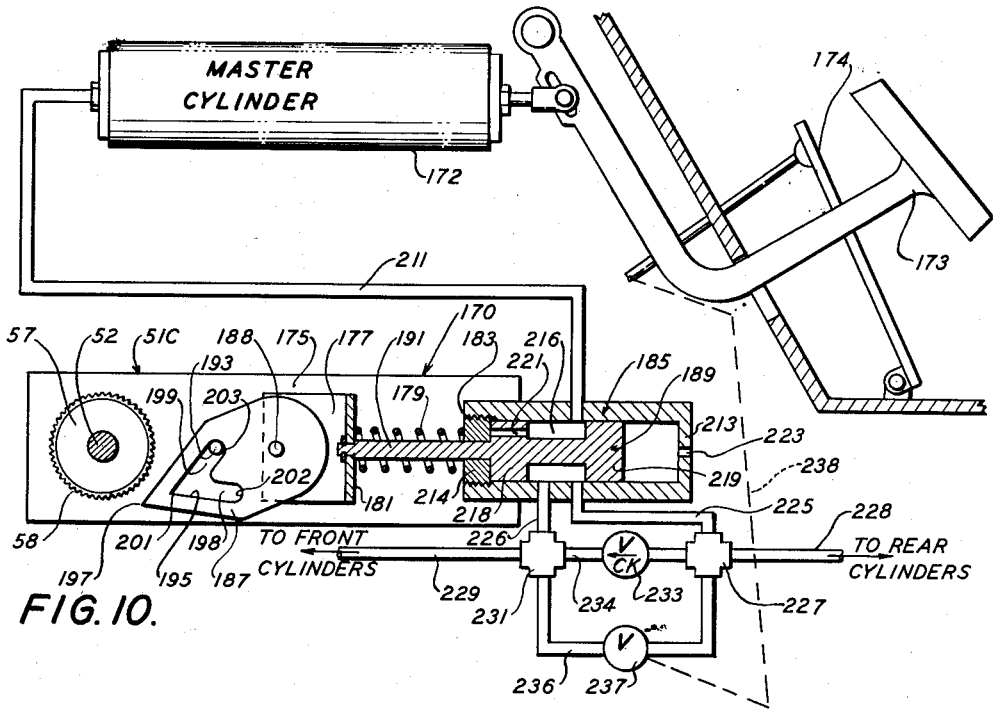
Figure 11:
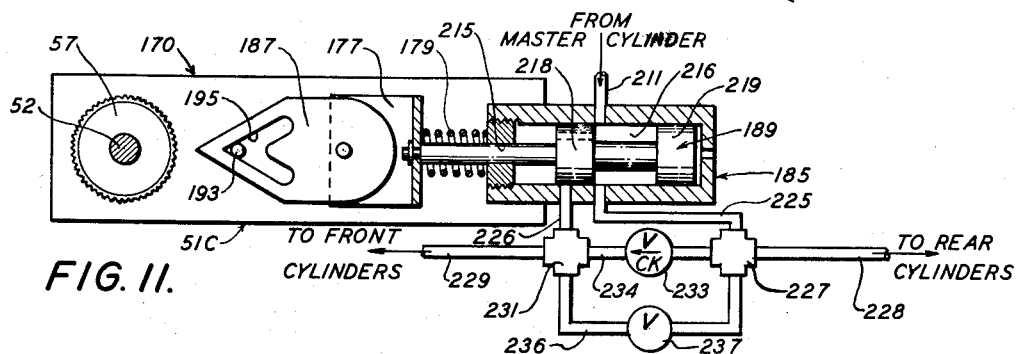
Figure 12:
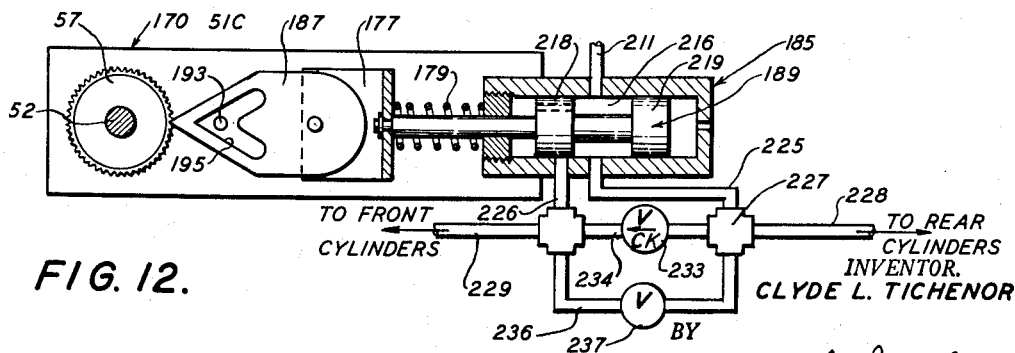

FIGS. 8A through 8D diagrammatically represent operational positions assumed by the engaging element of the embodiment of FIGS. 5 through 7;

FIGS. 9A and 9B are operative positions, shown diagrammatically, of an alternate embodiment of the engaging element of the motion detecting device of FIGS. 5 through 7;

FIG. 10 is a schematic diagram of a preferred embodiment of the invention used in conjunction with a vehicle braking system;

FIGS. 11 and 12 illustrate operative positions of the apparatus of FIG. 10 when the vehicle brake pedal is applied, and when there is no rotary motion, respectively.

The apparatus for detecting motion shown in FIGS. 1 through 4 comprises generally a base 10, a carriage or slide 11 mounted to move relative to the base, a cover 12 enclosing the slide, control means 13, such as a switch controlled by the slide, and a spring 14 biasing the slide to move in a direction toward one end of the base. Rotational means 15 are carried by the base at an end thereof toward which the slide is biased to move. A resilient member 16 carried by the slide and directed toward means 15 cooperates with cavity or pocket means 17 receptive of resilient member 16 upon deflection thereof by rotational means 15 and upon movement of the slide under impetus of biasing spring 14.

Base 10 may be formed as a plate 20 in which is provided a slideway 21 that extends longitudinally and has a side opening 22. Although shown as of rectangular form, the base may vary in shape, as desired. Adjacent one end of the base the same is provided with a bearing 23 and a concentric arcuate seat 24.

In the present instance, the base also includes a dielectric plate member 25 superimposed upon the face of plate 20, said member being formed with an opening 26 that conforms to the form of slideway 21 and its side opening 22. Thus, the base has a thickness that is the sum of the thicknesses of plates 20 and 25. Plate member 25 is used for insulation purposes in connection with control means 13. If the control means 13 is other than electrical means—valve, for instance—then base 10 may be made of a single plate, as can be understood.

Slide 11 is longitudinally movable in slideway 21 and comprises a main body part 27 and a laterally directed tongue 28 that extends through side opening 22 of the slideway and beyond the perimeter of the base so as to be in position to be engaged by a member 29. Member 29 comprises any element capable of being moved in one direction to engage and move the slide in one direction and in the opposite direction to release the slide.

Cover 12 is shown as a plate that may be affixed to base 10, as by rivets or screws 30, and comprises a plate that encloses the slideway to retain slide 11 therein. FIG. 4 shows the cover which, together with base 10, provides a thin, space-saving device.

It will be evident that slide opening 22 may be omitted and a suitable opening or slot provided in cover 12. In such case, the slide will be provided with an extension, in lieu of tongue 28, that passes through the opening in the cover. Movement of slide 11 controls means 13 whether the same is a switch, a valve, or other such device. In this case, a switch is shown. The switch comprises a pair of terminals 31 recessed into dielectric member 25 so as to be retained in the plate by cover 12. The latter, of course, is dielectric so that these terminals are electrically separated. The terminals extend into a recess 32 in the face of the slide and a bridging bar 33 is secured to the slide within the recess and in position to bridge the terminals when the slide is in retracted position, as in FIGS. 1, 2 and 4. FIG. 4 shows such bridging. Thus, with the slide retracted, an electric circuit that includes terminals 31 and bar 33 is closed, or, a valve is closed, as will be clear.

Slide 11 is biased toward the right in the drawings by the spring 14 that is disposed between an abutment 34 in the base and an opposed abutment 35 formed on the slide. The spring biases the slide to a position that opens switch 13.

In the illustrative embodiment of FIGS. 1 through 4, rotational means 15 is shown as a wheel 36 mounted in bearing 23 and having peripheral teeth 37. The teeth are in the form of serrations rather than gear teeth and are preferably sharp, as shown. The serrations shown represent any form of roughening on the periphery of the wheel that will non-slippingly engage a member impinged thereagainst. Means 15 further includes a shaft 38 that comprises the wheel axle or axes. Upon rotation of the shaft, the wheel turns with the shaft. It will be seen that the wheel rotationally fits the previously mentioned arcuate seat 24 formed in base 10.

Resilient member 16 is secured to and extends from slide 11 toward the wheel serrations. The member 16 preferably comprises a flat spring that has a free end 39 and is readily deflectable, although of reasonable rigidity when subjected to forces applied directly against the free end. When slide 11 is fully retracted, spring end 39 just clears the teeth or serrations 37. Thus, the wheel may turn without subjecting member 16 to wear.

Means 17 comprises two similar and opposite pockets 40 formed in base plate 20 at the ends of arcuate seat 24. Thus there is provided means on each side of the wheel to receive end 39 of resilient member 16 when the latter is deflected. Pockets 40 are so formed as to deflect the member away from serrations 37, as can be seen in FIG. 3, irrespective of which pocket receives the spring end.

The normal position of the motion detecting device is shown in FIG. 3, wherein switch 31 is open, shaft 38 may or may not be rotating and initiating member 29 is in slide releasing position. It will be assumed that shaft 38 is rotating by reason of its being connected to a shaft of a vehicle that is in rotation only when the vehicle is in motion, and that member 29 is moved toward the left in the drawings only when the vehicle brakes are applied. This represents the condition when the vehicle is in motion.

Upon setting the brakes, member 29 is moved toward the left, engaging slide tongue 28 and retracting the slide against the bias of spring 14. Member 16 assumes a central position directly aligned with the center of wheel 36 and end 39 of member 16 will thus be clear of the wheel serrations. This position of the device is shown in FIG. 1, the same showing switch 13 closed.

If the switch is connected to a brake setting device such as one used to hold vehicles on hills, the latter device will be energized to perform its function. In fact, any device connected to switch 13 will be thus placed in circuit. Thus, if a valve is used instead of switch 13, the valve is actuated upon such retraction of the slide.

Since the brakes of the vehicle are set, shaft 38 comes to rest. Now, should the brakes release, or be released, the apparatus controlled by switch 13 retains the shaft motionless, but member 29 moves to a position releasing slide 11 to be projected by its spring 14. When the slide is thus projected, end 39 of resilient member 16 impinges against wheel 36 in a dead-center position, as shown in FIG. 2. Thus, the slide moves but a little way and is retained retracted by the engagement between wheel 36 and member 16. Hence, switch 13 remains closed and the brake setting device or apparatus is still effective to arrest movement of shaft 38.

Only upon rotation of shaft 38 does slide 11 become released to project and to cause switch 13 to open. An external switch in series or a valve in parallel with the switch or valve means 13 respectively, can, then, assume control of the brake setting or similar device and the external switch or valve may be affected by the ordinary application of the throttle so as to release the brake-setting apparatus and increase the power of the engine, thus causing the vehicle propeller shaft to turn and, in turn, cause rotation of shaft 38 of the instant embodiment, It will be clear that the resultant deflection of member 16 brings its end 39 into that pocket 40 into which it was directed according to the direction of rotation of wheel 36.

The foregoing is given by way of example as it will be realized that the presently described apparatus can control other means in lieu of control means 13 (a switch), providing the same is subjected to an initiating force by a member comparable to member 29 and has its wheel 36 adapted to be rotated when said initiating force is withdrawn. Also, the propeller shaft may be the speedometer shaft, or cable, of an automobile upon which the apparatus is installed.

FIGS. 5 through 9B illustrate an alternate embodiment of the invention which is substantially similar in function to the previously described embodiment. However, the alternate embodiment has a motion-sensing or engaging element which lends itself to greater sensitivity and to more compactness than does the device of FIG. 1. In FIGS. 5 through 7 the embodiment of the invention generally indicated by the reference character 50 has a base 51 through which a rotatable shaft 52 extends. A pair of spaced shaft bearings 53 journal the shaft within a cylindrical bearing housing 54 fitted in a vertical bore 55 in base 51. A horizontal slot 56 extends across the base near upper end 51A of the base. The slot intersects bore 55 at upper end 54A of bearing housing 54 and extends to the midpoint of the bore. A rotatable element or wheel 57 is fixed about the shaft at end 54A of the housing and in line with the horizontal extent of the slot. Wheel 57 has continuous peripheral serrations 58 best seen in FIG. 7. The serrations represent any friction creating surface providing for non-slip contact with a pointed member.

The upper portion of bore 55 receives a thread end 59 which is held in place by set screw 61 in base 51. Shaft 52 terminates within the thread end in a hollow square shank 62 which, with the thread end, forms coupling means for linking shaft 52 to a conventional vehicle speedometer cable. The opposite end of shaft 52 has a square shank 64 which cooperates with a sleeve nut 65 to form a conventional coupler for attaching shaft 52 to the conventional speedometer cable output of the automobile transmission. Sleeve nut 65 is retained about shank 64 by a flange 66 of the bearing housing.

A thrust collar 67 is fixed to shaft 52 between rotating element 57 and the inner face of thread end 59. The thrust collar secures the shaft within the base and determines its longitudinal position relative to slot 56 and bearings 53.

Thus, the arrangement of the shaft within the base is such that the base and the rotating element of this embodiment may be interposed in the conventional speedometer cable line without altering the standard connections thereof. This particular embodiment has the additional advantage that only the bearing housing need be a precisely reamed and formed component. The alignment of the shaft and the wheel 57 are determined by the lodgement of the bearings within the reamed housing and precise machining of other component parts is thereby obviated.

Figure 8A:
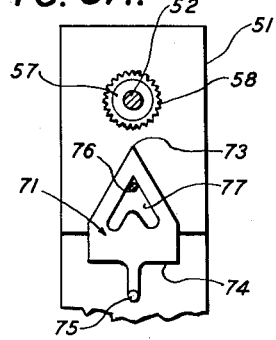

Slot 56 also affords a guiding recess or slideway in which an engaging element 71 is slidable, as best seen in FIGS. 5 and 8A. In plan, the engaging element is substantially triangular, having a sharp engaging point 73 adjacent wheel 57, and a broad trailing edge 74 remote from the point. An L-shaped tang 75 projects from the trailing edge horizontally and then upwardly with respect to rotating element 57. A pin 76 extends vertically across slot 56 and is anchored at each of its ends in base 51. The pin projects through a V-shaped aperture 77 of the engaging element. The walls defining the V-shaped aperture converge near point 73 in a dihedral angle bisected by a line connecting tang 75 and point 73. Pin 76 is aligned with the axis of wheel 57 and a pivot aperture 81 in a carriage member 83 which has a function analogous to that of slide 11 of the embodiment of FIGS. 1 through 4.

The carriage member may be the top horizontal flange of a spring strip 85 anchored near the bottom of base 51 to a cantilevered support plate 87. A pair of screws 88 fix the support plate to the bottom of the base. Spring strip 85 bears an electrical contact point 91 near a vertical edge and adjacent the juncture of the strip with the carriage member. Therefore, the rivets 92 securing the strip to the support plate are preferably electrically insulated from the plate.

As can be seen from FIG. 6, the spring strip is mounted to plate 87 so that the carriage member has a degree of horizontal freedom along the line defined by pin 76 and the axis of shaft 52 and wheel 57. If the spring strip is imposed upon by an outside force, its motion in the described direction carries the engaging element away from the rotatable element or wheel. The width of V-shaped aperture 77 along both of its arms is such that the engaging element has linear freedom to move along the line defined by the pivot aperture of the carriage member and pin 76 and the axis of the rotatable element. Such freedom is important in achieving the three positions assumed by the motion sensing components of the apparatus of the invention during different conditions of imposed load, or motion or non-motion of wheel 57.

In the embodiment of FIGS. 5 through 7 the force imposed on the carriage member of the apparatus of the invention emanates from an electro magnet 95. A coil 96 of the magnet is secured at an end of plate 87 remote from the base. A bolt 97 extends through the coil, securing it and top and bottom pole pieces 101, 102 in place. The pole pieces extend generally toward spring strip 85. When the electro-magnet is energized, the electro magnetic force impinges upon an armature 104 fixed by rivets 105 to the vertical extent of spring strip 85. Thus, the energized electro-magnet, with its pole pieces 101 and 102, tends to move the spring strip and hence the carriage member of the apparatus by means of the effect the electro magnetic field has upon armature 104. The energized coil pulls armature 104 rightwardly in FIG. 6, pivoting the armature on lower pole 102.

An L-shaped contact spring 106 is fixed to support plate 87 by means of a rivet 108, and is insulated therefrom by insulators 110, 111. Contact spring 106 bears an upper contact point 112, positioned for single pole, single throw engagement with contact point 91 on the spring strip. Therefore, the motion of carriage member 83 and engaging element 71 determines electrical continuity between spring strip 85 and contact spring 106.

The apparatus described may be sheathed in a U-shaped housing 114, which may be bolted to base 51. An insulating grommet 116 through one wall of the housing conducts electrical leads through the housing wall. Such leads are schematically represented in FIG. 6 as leads 118, 119 from the coil, and electrical leads 121, 122 from the contacts of the spring strip and the contact spring, respectively. A cover plate 124 fits atop U-shaped housing 114 and effectively seals the unit against dirt and dust. The cover plate and housing may be bolted to the base. The housing and the cover are shown in exploded fashion in FIG. 5, but for clarity, they have been removed in FIGS. 6 and 7.

As mentioned before, the effect of electro magnet 95 on carriage member 83 is analogous to the imposed force placed on slide 11 by member 29 of the embodiment of FIGS. 1 through 4. In operation, the electromagnet 95 of FIGS. 5 through 7 may be energized by closing normally open switch 131. Closure may be under urging of a brake pedal 132 of the vehicle to which unit 50 may be mounted. Switch 131 can, therefore, be the conventional stoplight switch of the vehicle.

The electrical circuit closed by contact between contact points 91 and 112 of the spring strip and the contact spring, respectively, preferably includes a solenoid 133 controlling a hydraulic valve 134. Valve 134 is imposed in the hydraulic line between the vehicle brakes and the brake master cylinder (not shown).

The operation of the embodiment of FIGS. 5 through 7 is best explained through reference to FIGS. 8A through 8D. As pointed out heretofore, there are three positions assumed by the elements of the motion detecting apparatus. They are the first, or non-engaged position shown in FIG. 8A, the second, or engaged position of FIG. 8B, and the third, or deflected, position of FIG. 8C. This latter position results from motion by the rotatable element at the time of sensing by the engaging element. In FIG. 8A, the position results from imposition of force by electro magnet 95 upon carriage member 83. The imposed force overcomes the biasing load against the carriage member by spring strip 85, and retracts engaging element 71 against pin 76. The previously described alignment of pin 76, aperture 81, point 73, and the axis of the wheel is such that point 73 is now in dead-center alignment with the axis of that rotatable element. The first position depicted in FIG. 8A results from application of the vehicle brakes and the subsequent energizing of the electro magnet. We must, therefore, assume that wheel 57 is stopped or in non-rotating condition. But, when the brake pedal is released, switch 131 opens, de-energizes coil 96, and restores the biasing effect of spring strip 85 upon carriage member 83. The bias load projects the carriage member and the engaging element into the position shown in FIG. 8B. This is the second position, in which motion or non-motion is sensed, and the sharp point of the engaging element contacts the serrated periphery of the wheel in dead-center alignment with the axis of rotatable element or wheel 57. Should the engaging element detect no motion of wheel 57 the condition schematically shown in FIG. 8B continues. The motion of carriage member 83 toward the rotatable element is therefore slight, and measured by the interval between pin 76 and the dihedral formed by the intersection of the walls of cam aperture 77 of the engaging element. This motion is insufficient to break contact between points 91 and 112, so that solenoid 133 remains energized. Valve 134 is therefore kept closed and braking force is still applied to the vehicle wheels without continuous depressing of brake pedal 132. Thus, in both the positions shown in FIGS. 8A and 8B a closed circuit attains, and braking power is maintained on the vehicle wheels.

Figure 8C:
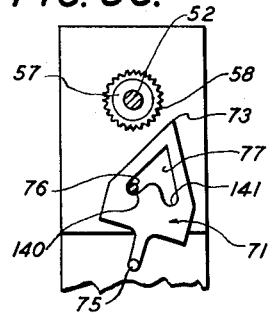

FIG. 8C schematically shows the positions assumed by components of the apparatus when normally open switch 131 re-opens and engaging element 71 detects motion on the part of wheel 57. In this condition, the rotating motion of wheel 57 deflects element 71 from its dead-center alignment with the axis of the wheel. Deflection allows the full bias potential of spring strip 85 to project the carriage member toward shaft 52. Pin 76 arrests projection of the deflected engaging element when a wall of one of the aperture pockets 140 or 141 therein strikes the pin. Each of the diverging arms of the V-shaped aperture terminates in a pocket.

The third position illustrated in FIG. 8C is assumed in response to the full bias load of spring strip 85. There is no electrical contact in this position between contact points 91 and 112. Thus, solenoid 133 is de-energized and valve 134 opens for fluid flow from the individual brake cylinders to the master cylinder. In order to avoid drag from the automatically set brake, a switch in series with the contact points of the device, or a normally closed valve in parallel with fluid valve 134, may be responsive to the throttle at the time that the engine is accelerated. FIG. 6 shows such a switch 145, in line 121.

Figure 8B:
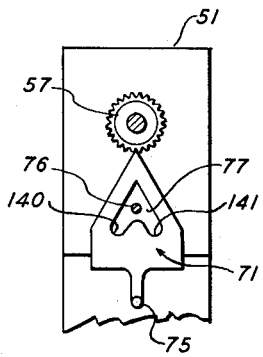
Figure 8D:
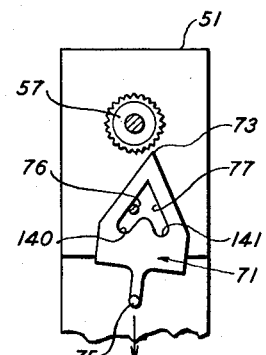

In FIG. 8D the engaging element occupies an intermediate position between third and first positions. The camming effect of pin 76 is demonstrated in this figure. As the engaging member is retracted against the biasing load of spring strip 85, under the influence of the imposed load of the electro magnet, the wall of the aperture slides along the pin and orients the engaging element to the position of FIG. 8A, in which pin 76 centers the point of the element in dead-center alignment with the rotatable element. As the dihedral angle of the aperture seats against the periphery of the pin, retraction of carriage member 83 is also limited by means of the linking tang of element 71 that resides in pivot aperture 81 of the carriage member.

FIGS. 9A and 9B show schematically an alternate form of engaging element. An engaging element 151 comprises a pointed body 152 having a rearward tang 153 which preferably pivots from a carriage (not shown) similar to member 83 of the unit 50 just described. Left and right engaging arms 154, 155 project oppositely from the intermediate portion of the body, transversely to the general line of motion B—B of the body. Spaced pairs of static arms 158, 159 and 160, 161 extend inwardly transversely to line B—B from opposite sides of a slideway 162 of a base 51B similar to base 51 of FIG. 5.

Line B—B extends through the central axis of rotatable element or wheel 57 and its shaft 52. Thus, when engaging element 151 traverses the slideway along line B—B, it is in dead-center alignment with the axis of the rotatable element, as is typical of the two previously described embodiments. FIG. 9A shows the components of the apparatus in the first position, in which the carriage member and the engaging element are retracted due to the imposed force. The imposed force in the case of the embodiment of FIGS. 9A and 9B may be a magnetic field. The imposed load transmitted through tang 153 retracts the engaging element so that opposing engaging arms 154, 155, seat against static arms 159, 161. The arms are all precisely aligned transversely of line B—B and thus the contact between the static arms and the engaging arms causes the body 152 to line up in the essential dead-center alignment with the axis of the rotatable element. The dotted position 151A of the engaging element represents the second position assumed by the components of the embodiment in the partially projected position. This position is assumed when the outside force is no longer imposed and the biasing load of the spring strip projects the engaging element into contact with the serrated periphery of the wheel. The dotted position attains as long as the engaging element senses a non-rotational condition of wheel 57. Should rotation be detected, the third position of the components then avails as illustrated in FIG. 9B.

In FIGURE 9B the direction of rotation of wheel 57 is counter-clockwise. A counter-clockwise rotation of wheel 57 deflects element 151 rightwardly in that figure so that engaging arm 155 of element 151 impinges on static arm 160. The point of the element is out of contact with wheel 57, and the further projection of engaging element 151 is limited by its contact with static arm 160. The static arm sets the limit of projection which is due to the bias loading of the spring strip.

It is worthy of note that in the embodiments of both FIG. 8A and FIG. 9A the engaging elements in position one are retracted so that there is no contact between the sensing points of the respective elements and the rotatable element. Thus, even though there may be a decelerating rotation of the wheel, there is no frictional contact between the engaging element and the wheel. This makes for long sensitivity life, since the sharpness of the engaging element is a factor in sensitivity in motion or non-motion detecting.

A preferred embodiment of the invention is shown in FIGS. 10 through 12. This embodiment is particularly adapted to detecting motion for control means in a vehicle braking system. The preferred embodiment comprises a motion detecting device indicated generally by reference character 170 that is used in combination with conventional vehicle braking system, including a master cylinder 172, a brake pedal 173 and an engine throttle 174. The motion detecting device includes a shaft 52 to which is fixed a rotatable element or wheel 57 having a continuous series of serrations 58 about its periphery. The shaft and rotatable wheel 57 may be mounted in a base 51C and be substantially similar to the like components described with respect to FIG. 5. Base 51C has a slideway 175 across which a carriage member or slide 177 is reciprocable. A spring 179 extends between an upturned flange 181 of the slide and an exterior face 183 of a hydraulic control valve 185 fixed to the base in any convenient manner. Spring 179 exerts a biasing load on slide 177, urging it toward wheel 57.

The slide carries an engaging element 187 pivotably secured to the slide by a pivot pin 188. The engaging element is free to pivot in the plane of the slideway about the pivot pin, but is restricted thereby from vertical motion with respect to the slide.

Control valve 185 has a piston 189 from which a piston rod 191 extends to be fixed to flange 181 of the slide. The orientation of the control valve with respect to base 51C is such that projection or retraction of the valve piston moves the slide along a line passing directly through the axis of wheel 57. Pivot pin 188 is centered on the projected line between the piston and the wheel axis. A cam pin 193 is fixed in base 51C in alignment with the axis of wheel 57 and piston rod 191. The pin extends through a V-shaped aperture 195 in the engaging element. Aperture 195 is defined by walls that converge remote from the pivot pin and adjacent a sharp point 197 of the engaging element. Point 197 is that part of the engaging element that makes sensing contact with rotatable element 57.

Arms 198, 199 of the aperture terminate away from their apex 201 in pockets 202, 203. The function of V-shaped aperture 195 and cam pin 193 is substantially the same as that described for the aperture and pin of previously described FIGS. 8A through 8D. One or the other of the pockets lodges against the cam pin when the engaging element is deflected by rotation of rotatable element 57, thereby limiting projection of the slide due to the bias loading. This condition of the apparatus is shown in FIG. 10. In FIG. 11 the cam pin has cammed the engaging element into dead-center alignment with the axis of wheel 57 as the converging aperture walls seat tangentially against the cam pin. FIG. 12 illustrates position two, in which aperture walls are out of contact with the cam pin as the components respond to the condition when the device senses non-rotation of wheel 57. The configuration of the aperture is such that the engaging or sensing element is free to deflect, without interference from the cam pin, from the contact position shown in FIGURE 12. It is therefore apparent that in basic function the operation of engaging element 187 is substantially identical to the operational function of element 71 of FIGS. 5 through 8D.

Control valve 185 is uniquely designed to combine with the other components of the motion detecting apparatus of the invention as the control means for a hydraulic system such as a vehicle braking system. In the illustrative embodiment the valve is shown linked to the master cylinder by fluid line 211. The line extends to the interior of valve body 213 of valve 185. The body is closed at one end and capped at the other by a threaded plug 214. The plug has a central port 215 through which piston rod 191 reciprocates in fluid-sealed relationship. The seal may be accomplished by conventional O-rings or packing (not shown).

Piston 189 of the valve has an annular passage 216 centrally of the piston. Passage 216 separates leading and trailing piston segments 218, respectively. Piston segment 218 has an axial orifice 221 connecting between the piston passage and the space between segment 218 and plug 214. Therefore, when fluid is introduced from the master cylinder it is transmitted through the orifice to the space so that the entire piston may be displaced from the position of FIG. 10 rearwardly to the position of FIG. 11. Body 213 is ported at 223 to relieve pneumatic buildup between piston segment 219 and the interior wall of the control valve body.

A hydraulic line 225 connects to the interior of the valve diametrically opposite the entry of line 211. Another fluid line 226 enters the valve body at a point displaced forwardly from the entry of line 225. Line 225 enters a cross fitting 227 from which a fluid line 228 extends to the rear brake cylinders of the vehicle. A similar fluid line 229 extends to the front brake cylinders from a cross fitting 231 into which line 226 connects. A check valve 233 is interposed in a line 234 extending between the cross fittings. A bypass line 236 also connects the two cross fittings. A normally closed valve 237 is interposed in line 236. Valve 236 is mechanically or electrically responsive to motion of accelerator pedal 174, as indicated by the broken line 238.

FIGS. 10, 11 and 12 illustrate the three basic positions of the motion detecting apparatus of the invention. In FIG. 10 the engaging element is shown deflected out of contact with the rotatable element. Such deflection is normally caused by clockwise rotation of the rotatable element as viewed in FIG. 10. The engaging element has been deflected to that pocket 203 of aperture 195 in contact with cam pin 193. The cam pin not only arrests further projection of the engaging element and slide 177 under urging of bias spring 179, but also conditions the engaging element for reorientation into the position of FIG. 11 in the manner described in conjunction with FIGS. 8A through 8D.

As inspection of FIG. 10 shows, piston 189 occupies a leftward position when brake pedal 173 is not depressed. In this position, which is assumed under the bias loading of spring 179, all of the fluid lines are open to mutual communication. Fluid is free to flow from the master cylinder into lines 225 and 226 and thence through the cross fittings to the lines 228, 229 leading to the rear and front brake cylinders. Valve 237, which is normally closed, is open if the throttle is advanced, providing an additional path between the two cross fittings. Additionally, fluid may flow unidirectionally from cross fitting 227 through check valve 233 to line 229.

When the throttle is released and the brakes are applied, valve 237 assumes its normally closed position, blocking fluid exchange between the cross fittings through line 236. Fluid is expelled from the master cylinder by the brake pedal pressure through line 211 and into piston passage 216 between the two piston segments. As previously described, flow through orifice 221 displaces the piston rightwardly, camming the engaging element into the position shown in FIG. 11 in which the loading of bias spring 179 is overcome.

In the condition shown in FIG. 11 line 226 is closed by piston segment 218 so that no direct flow from the master cylinder to the front brake cylinders can take place. However, there is flow to the front brakes through check valve 233 and line 234 between the cross fittings. Line 225 is still open to piston passage 216 so that there is direct transfer of fluid through valve 185 to the rear brake cylinders.

If the brake is released when the condition FIG. 11 prevails, then fluid tends to return from the front and rear brake cylinders through lines 229 and 228, respectively, and through valve 185 to the master cylinder. However, front piston segment 218 precludes return of fluid from the front brake cylinders through line 226. Additionally, check valve 233 in line 234 prevents back flow between the cross fittings. Therefore, valve 237 is controlled by the foot throttle so that it may be open should the operator of the vehicle wish to resume motion. As fluid returns to the master cylinder, the imposed load which has been overcoming bias spring 179 is removed, and slide 177 and engaging element 187 move forward in dead-center alignment with rotatable element 57. The third position of the motion detecting device is then assumed as illustrated in FIGURE 12.

As shown in FIG. 12, projection of slide 177 under the bias load of spring 179 is arrested by rotatable element or wheel 57. In this arrested projected position, segment 218 of the piston still precludes flow of fluid through valve 185 from line 226. Line 229, therefore, cannot return fluid by way of line 226, nor by way of line 234 because of the check valve. If the throttle is not depressed, then valve 237 is in its normally closed position. The fluid from the master cylinder is trapped in the front wheel brake cylinders and the front brakes remain on. Thus, the vehicle is held in arrested condition, as would be desirable were it stopped on a hill, or if forward motion due to transmission creep was not wanted.

If, when slide 177 is projected into the position of FIG. 12 by bias spring 179, the wheel 57 is rotating, then the engaging element 187 is deflected, as shown in FIG. 10. The direction of deflection depends upon the direction of rotation of wheel 57.

The condition illustrated in FIG. 12 continues as long as the vehicle remains motionless and no rotation is imparted to wheel 57. Were wheel 57 turning, as it might be if braking were applied merely to slow the vehicle (not to stop it), then rotating wheel 57 immediately forces engagement element 187 to one side, as in FIG. 10, with no brake holding action resulting. If the brake were re-applied, then the condition of FIG. 11 would once again be assumed. As soon as the brake was released, the position of FIG. 12 is again assumed. When throttle 174 is depressed in the condition of FIG. 12, to put the vehicle in moton, valve 237 opens immediately. Fuid may thereby be returned to the master cylinder from the individual front brake cylinders. There is therefore no perceptible brake drag during initial acceleration.

The embodiment of the invention illustrated in FIGS. 10 through 12 is ideally suited to use with vehicles having fluid braking systems. However, the inventive concept illustrated by the several embodiments of the application point up the fact that the components of the apparatus of the invention may vary depending upon the use to which the particular embodiment may be put. The inventive concept is not limited to use with vehicles, but is useful wherever motion-sensing components can be used for actuating control means for any mechanism. The embodiments illustrated by no means exhaust the potentialities of the invention. Many variations will occur to those skilled in the art, within the scope of the invention, as defined by the following claims.

I claim:

1. A motion detecting device comprising a base, a slide member movable relative to the base, means biasing said slide member to a projected position, said member being adapted to be retracted by an outside force applied thereto, control means operated between control and non-control positions by the mentioned projection and retraction of the slide member, a resilient element carried by said slide member and disposed along the line of projection and retraction of the member, a rotatable element having its axis in dead-center alignment with the resilient element, whereby upon projection of the movable slide member, said resilient element will effect dead-center engagement with the rotatable member when the latter is non-rotational to hold the slide member partly retracted, control means controlled by said slide member and maintaining its control position during both retraction and partial projection of the slide member.

2. A motion-detecting device according to claim 1 in which the base is provided with a pocket on each side of the rotatable element and transverse to the disposition of the resilient element, said pockets being receptive of the impinging end of the resilient element upon rotation of the rotatable element in one or the other direction to deflect the resilient element out of its dead-center disposition.

3. A motion-detecting device according to claim 1 in which the base is provided with a pocket on each side of the rotatable element and transverse to the disposition of the resilient element, said pockets being receptive of the impinging end of the resilient element upon rotation of the rotatable element in one or the other direction to deflect the resilient element out of its dead-center disposition, said pockets being spaced relative to the rotatable element to bias the deflecting end of the resilient element out of engagement with the rotatable element.

4. A motion-detecting device according to claim 2 in which the rotatable element is provided with peripheral serrations to non-slidingly engage said impinging end of the resilient element.

5. A spring-biased member provided with a flexible element, means guiding said member to move along a path parallel to the disposition of the flexible element, and a rotatable element having its axis in dead-center alignment with said flexible member and provided with serrations that are non-slippingly engaged by the end of the flexible element to hold the member against projection.

6. A spring-biased member provided with a flexible element, means guiding said member to move along a path parallel to the disposition of the flexible element, a rotatable element having its axis in dead-center alignment with said flexible member and provided with serrations that are non-slippingly engaged by the end of the flexible element, to hold the member against projection, a pocket for receiving the end of said flexible element upon deflection thereof by the rotatable element and projection of the spring-biased member.

7. A spring-biased member provided with a flexible element, means guiding said member to move along a path parallel to the disposition of the flexible element, a rotatable element having its axis in dead-center alignment with said flexible member and provided with serrations that are non-slippingly engaged by the end of the flexible element, to hold the member against projection, a pocket for receiving the end of said flexible element upon deflection thereof by the rotatable element and projection of the spring-biased member, said pocket being located to one side and in spaced adjacency to the rotatable element.

8. A linearly biased member having an engaging element movable with respect to the linear motion of the biased member, means guiding said member along a linear path, and a rotatable element having its axis in dead-center alignment with the path of the engaging element as carried by the biased member and having serrations adapted to be non-slippingly engaged by the end of the engaging element to hold the biased member against biased motion.

9. A motion-detecting device comprising a base, a slide member movable relative to the base, means biasing said slide member to a projected position, said member being adapted to be retracted by an outside force applied thereto, control means operated between control and non-control positions by the mentioned projection and retraction of the slide member, an engaging element carried by said slide member and disposed along the line of projection and retraction of the slide member, and a rotatable element having its axis in dead-center alignment with the path of the engaging element as carried by the slide member so that the engaging element effects dead-center engagement with the rotatable member when said member is non-rotational to hold the slide member partly retracted, the control means maintaining its control position during both retraction and partial projection of the slide member.

10. Apparatus in accordance with claim 9 in which the control means comprises a valve body fixed with respect to the base, a valve piston movable in the body, a piston rod extending exteriorly of the body and fixed to the slide member so as to move the piston in response to retraction and projection of the slide member, inlet and outlet ports in the body leading to the mechanism to be controlled, and a piston passage adapted to connect selectively between inlet and outlet ports as the piston assumes differing positions so as to exercise control in response to motion or non-motion of the rotatable element.

11. Apparatus in accordance with claim 9 in which the rotatable element is provided with peripheral serrations to non-slippingly engage the impinging end of the engaging element.

12. Apparatus in accordance with claim 9 further comprising a pin in the base, a sharp impinging end on the engaging element, a V-shaped aperture in the engaging element through which the pin projects, said aperture having an apex adjacent the impinging end of the engaging element, and pockets adapted to seat against the pin when the slide member is in projected position, said pockets being defined by aperture walls remote from the aperture apex.

13. Apparatus in accordance with claim 12 in which the engaging element is pivotably secured to the slide member.

14. A motion-detecting device comprising a base, a carriage member movable relative to the base, means biasing said carriage member to a projected position, said member being adapted to be retracted by an outside force applied thereto, control means operated between control and non-control positions by the mentioned projection and retraction of the carriage member, an engaging element carried by said carriage member and disposed along the line of projection and retraction of the carriage member, and a rotatable element having its axis in dead-center alignment with the path of the engaging element as carried by the carriage member so that the engaging element effects dead-center engagement with the rotatable member when said member is non-rotational to hold the carriage member partly retracted, the control means maintaining its control position during both retraction and partial projection of the carriage member.

15. A motion detecting device for controlling actuating means for a braking system comprising a base, a carriage member movable relative to the base, a leaf spring biasing said carriage member to a projected position, an electro-magnet adapted to retract the carriage member, a control switch operated between control and non-control positions by the mentioned projection and retraction of the carriage member, an engaging element carried by said carriage member and disposed along the line of projection and retraction of the carriage member, and a rotatable element having its axis in dead-center alignment with the path of the engaging element as carried by the carriage member so that the engaging element effects dead-center engagement with the rotatable member when said member is non-rotational to hold the carriage member partly retracted, the control means maintaining its control position during both retraction and partial projection of the carriage member.

16. Apparatus in accordance with claim 15 in which the rotatable element is provided with peripheral serrations to non-slippingly engage the impinging end of the engaging element.

17. Apparatus in accordance with claim 15 further comprising a pin in the base, a sharp impinging end on the engaging element, a V-shaped aperture in the engaging element through which the pin projects, said aperture having an apex adjacent the impinging end of the engaging element, and pockets adapted to seat against the pin when the slide member is in projected position, said pockets being defined by aperture walls remote from the aperture apex.

18. Apparatus in accordance with claim 15 in which the control switch comprises a first contact point on the leaf spring, said leaf spring being electrically connected to the actuating means for the braking system, a spring strip insulated from the base and supported thereon, and a second contact on the spring strip, said strip being adapted to hold said second contact in electrical union with the first contact during retraction and partial projection of the carriage member.

19. Apparauts in accordance with claim 18 in which the leaf spring supports the carriage member.

20. Apparatus in accordance with claim 15 in which the base comprises a slide path for the engaging element, a first pair of spaced static arms extending transversely into the slide path, a second pair of spaced static arms extending into the slide path and in transverse alignment with the first pair of static arms, said engaging element comprising a body movable along the slide path by the carriage member, and engaging arms extending oppositely from the body so as to move freely between the static arms when the engaging element is projected and retracted in dead-center alignment with the rotating element axis, the length of the static and of the engaging arms being such that one engaging arm contacts one static arm and the other engaging arm moves beyond the opposed static arm when movement of the rotatable element is detected so that the engaging element may project out of engagement with the rotatable element.

References Cited in the file of this patent

UNITED STATES PATENTS

| | | |
|---|---|---|
| 1,797,602 | Bryson | Mar. 24, 1931 |
| 2,507,140 | Bule | May 9, 1950 |
| 2,604,789 | Derby et al. | July 29, 1952 |
| 2,630,196 | Weiss et al. | Mar. 3, 1953 |
| 2,849,557 | Long | Aug. 26, 1958 |
| 2,902,850 | Sheffer | Sept. 8, 1958 |
| 2,913,906 | Sinclair | Nov. 24, 1959 |

FOREIGN PATENTS

| | | |
|---|---|---|
| 1,073,882 | France | Sept. 29, 1954 |